US009749959B2

(12) United States Patent
Graham

(10) Patent No.: US 9,749,959 B2
(45) Date of Patent: Aug. 29, 2017

(54) POWER CONTROLLED NETWORK DEVICES FOR SECURITY AND POWER CONSERVATION

(75) Inventor: Richard W. Graham, Salem, NH (US)

(73) Assignee: Extreme Networks, Inc., San Jose, CA (US)

(*) Notice: Subject to any disclaimer, the term of this patent is extended or adjusted under 35 U.S.C. 154(b) by 0 days.

(21) Appl. No.: 12/834,336

(22) Filed: Jul. 12, 2010

(65) Prior Publication Data

US 2011/0072286 A1 Mar. 24, 2011

Related U.S. Application Data

(62) Division of application No. 11/332,703, filed on Jan. 13, 2006, now Pat. No. 7,756,544.

(60) Provisional application No. 60/643,987, filed on Jan. 13, 2005.

(51) Int. Cl.
| | |
|---|---|
| G06F 1/00 | (2006.01) |
| H04W 52/02 | (2009.01) |
| G06F 1/32 | (2006.01) |
| H04W 72/08 | (2009.01) |
| H04W 88/08 | (2009.01) |
| G06F 11/07 | (2006.01) |
| H04W 84/12 | (2009.01) |
| G06F 11/36 | (2006.01) |
| H04Q 11/00 | (2006.01) |
| H04W 40/24 | (2009.01) |

(52) U.S. Cl.
CPC .......... *H04W 52/0258* (2013.01); *G06F 1/32* (2013.01); *G06F 11/0751* (2013.01); *G06F 11/3676* (2013.01); *H04Q 2011/0081* (2013.01); *H04W 40/246* (2013.01); *H04W 52/02* (2013.01); *H04W 52/0251* (2013.01); *H04W 72/082* (2013.01); *H04W 84/12* (2013.01); *H04W 88/08* (2013.01); *Y02B 60/50* (2013.01)

(58) Field of Classification Search
CPC .... G06F 1/32; G06F 11/0751; G06F 11/3676; H04W 88/08; H04W 40/246; H04W 52/02; H04W 72/082; H04W 52/0251; H04W 84/12; H04Q 2011/0081
USPC .......................................................... 713/300
See application file for complete search history.

(56) References Cited

U.S. PATENT DOCUMENTS

| | | | |
|---|---|---|---|
| 6,215,764 B1 * | 4/2001 | Wey et al. ..................... 370/216 |
| 7,203,849 B2 | 4/2007 | Dove | |
| 7,231,198 B2 * | 6/2007 | Loughran .................. 455/343.2 |
| 7,756,544 B1 | 7/2010 | Graham | |
| 2003/0099076 A1 | 5/2003 | Elkayam et al. | |
| 2003/0169760 A1 * | 9/2003 | Sato ........................ H04L 45/00 370/431 |

(Continued)

*Primary Examiner* — Xuxing Chen
(74) *Attorney, Agent, or Firm* — Ropes & Gray LLP

(57) ABSTRACT

The present invention provides method and systems for activating or deactivating network devices by managing the power of the network device. By controlling the power for network devices, the size and coverage of the network can be adjusted to meet the needs for the current usage. This can be particularly advantageous in wireless networks where multiple wireless access points may be provided to provide coverage during peak usage but present the additional security concern of the network being accessible to unauthorized users. Being able to power down unneeded wireless access points during off-peak usage allows for the minimization of such potential security concerns.

19 Claims, 2 Drawing Sheets

(56) References Cited

U.S. PATENT DOCUMENTS

| | | |
|---|---|---|
| 2003/0206531 A1 | 11/2003 | Shpak |
| 2004/0122985 A1 | 6/2004 | Parra et al. |
| 2004/0259558 A1* | 12/2004 | Skafidas ............... H01Q 1/246 |
| | | 455/450 |
| 2005/0003827 A1 | 1/2005 | Whelan |
| 2005/0085212 A1 | 4/2005 | Peker et al. |
| 2005/0154933 A1 | 7/2005 | Hsu et al. |
| 2005/0268120 A1 | 12/2005 | Schindler et al. |
| 2006/0070113 A1 | 3/2006 | Bhagwat et al. |

* cited by examiner

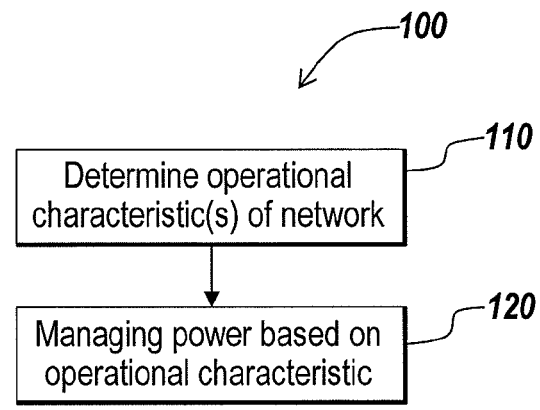
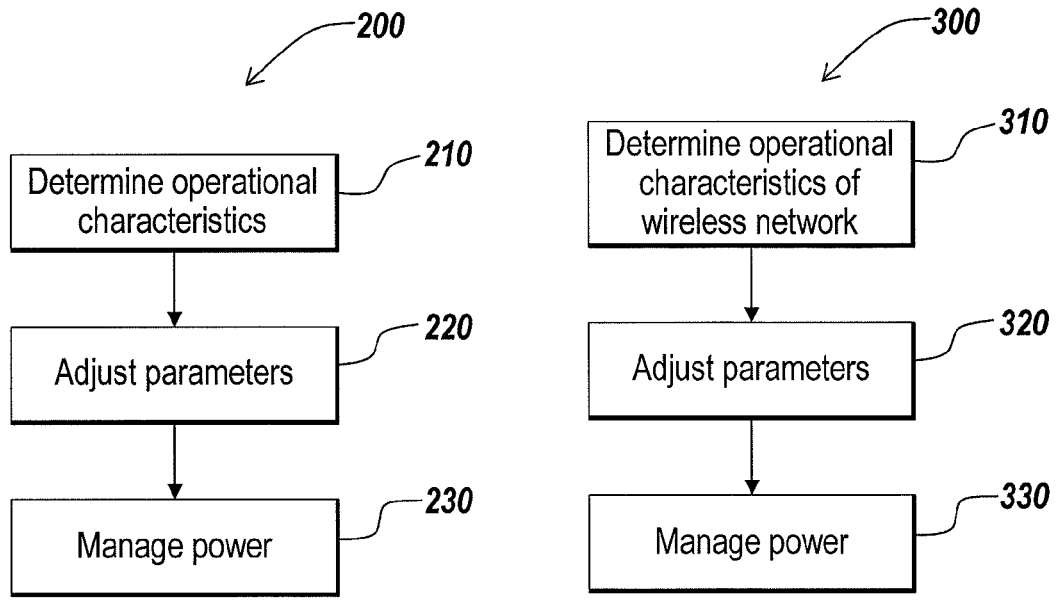
*Fig. 1*
*Fig. 2*
*Fig. 3*

POWER CONTROLLED NETWORK DEVICES FOR SECURITY AND POWER CONSERVATION

RELATED APPLICATIONS

This application is a divisional of U.S. patent application Ser. No. 11/332,703 filed Jan. 16, 2006, which claims priority to U.S. Provisional Patent Application No. 60/643,987, entitled "Power Controlled Wireless Access Points for Security and Power Conservation", filed Jan. 13, 2005, both applications are incorporated herein by reference in their entirety.

TECHNICAL FIELD

The present invention generally relates to networking. More Specifically, it relates to IEEE 802 networking approaches, Power over the Ethernet (POE) and the access, control, and security of networking.

BACKGROUND INFORMATION

Typically, network systems are deployed in a manner that provides maximum coverage and connectivity so as to minimize loss of connection during peak usage. In many instances this involves multiple network devices often deployed in a redundant or overlapping manner. One disadvantage of such systems is that during non-peak usage, many of the provided network devices may not be needed and are unnecessarily powered and active. In addition, the greater the number of active network devices, the greater the security risk for the system. That is, each active network device is a potential entry point for intrusion into the network.

Therefore, what is needed is means of managing the power for network devices depending on the level of connectivity required by the network. In this manner, power consumption and security issues can be minimized when there is low demand on the network by powering down or deactivating network devices that are not required to provide connectivity.

SUMMARY OF THE INVENTION

The present invention provides method and systems for activating or deactivating network devices by managing the power of the network device. By controlling the power for network devices, the size and coverage of the network can be adjusted to meet the needs for the current usage. This can be particularly advantageous in wireless networks where multiple wireless access points may be provided to provide coverage during peak usage but present the additional security concern of the network being accessible to unauthorized users. Being able to power down unneeded wireless access points during off-peak usage allows for the minimization of such potential security concerns.

In accordance with a first embodiment, a method is provided for managing power of a network device. The method comprises the steps of determining one or more operational characteristics of a network associated with the network device; and managing power consumption of the network device based on the one or more operational characteristics of the network.

In accordance with another embodiment, a method is provided for managing power of a network device providing wireless connectivity to a network. The method comprises the steps of determining a state of wireless connectivity provided by the network; and managing power consumption of the network device based on the state of wireless connectivity.

In accordance with another embodiment, a method of managing power to one or more network devices associated with a network is provided. The method comprises the steps of determining a location of one or more network users; controlling a state of a first wireless access point associated with the network based on the location of at least one of the network users; and powering down a second wireless access point having no users associated therewith.

In accordance with another embodiment, an electronic device associated with a network is provided. The electronic device comprises a location mechanism configured to determine a location of one or more network users; a control mechanism configured to output a control signal based on the location of the one or more network users, the control signal controlling an operational state of a plurality of wireless access points associated with the network based on the location of at least one of the network users; wherein each of the plurality of wireless access points in response to receipt of the control signal takes an action to perform one of powering down, powering up, reducing an amount of power consumption, increasing an amount of power consumption, and maintaining an amount of power consumption.

In accordance with another embodiment, an electronic device associated with a network having a plurality of wireless access points is provided. The electronic device comprises a location mechanism configured to determine a location of one or more network users; a control mechanism configured to output a control signal based on the location of the one or more network users, each of the plurality of wireless access points having an input to receive the control signal, wherein each of the plurality of wireless access points includes a power control mechanism responsive to the control signal and a beam steering mechanism responsive to the control signal, wherein each of the power control mechanisms in response to receipt of the control signal takes an action to transition a respective one of the plurality of wireless access points from a first power state to a second power state and to maintain a respective one of the plurality of wireless access points in one of the first power state and the second power state; and wherein a portion of the beam steering mechanisms of the plurality of wireless access points in the first power state in response to receipt of the control signal take an action to provide a selected level of wireless access coverage to the one or more users while conserving an amount of power consumed of the plurality of wireless access points.

In accordance with another embodiment, a network device associated with a network having a plurality of network devices is provided. The network device comprises a monitoring mechanism configured to monitor one or more wireless connectivity parameters of the network at a selected sampling rate to detect a change in a number of wireless network users; and a control mechanism configured to output a control signal based on the change in the number of wireless network users, wherein a first portion of the plurality of network devices associated with the network each have an input to receive the control signal and in response to receipt of the control signal the first portion of the network devices each initiate a change in a level of power consumption, and wherein a second portion of the plurality of network devices associated with the network each have an input to receive the control signal and in response to receipt of the control signal each of the second portion of the network devices initiates a change in an operational characteristic to provide a selected level of network services to the wireless network users.

In accordance with another embodiment, in a network device associated with a network, a method is provided. The method comprises the steps of sampling one or more network parameters; determining from the one or more network parameters a change in a number of wireless network users; controlling an operational characteristic of the network based on the change in the number of wireless network users; and powering off another network device associated with the network.

In accordance with another embodiment, a network device is provided. The network device comprises a port adapted to receive a transmission medium for transmitting a power signal, a power module having circuitry to manage power consumption of said network device and an input to receive a control signal; and a control module having an output to assert said control signal in response to a change in a state of a network associated with said network device, wherein the circuitry in response to receipt of the control signal takes an action to change a level of power consumption of said network device to provide a selected level of service based on the change in the state of the network.

In accordance with another embodiment, a method for managing power of a network device in a network is provided. The method comprises the steps of determining one or more operational parameters of one or more network devices and associated functions, managing power consumption of a selected one or more of the network devices based on the one or more operational parameters of the one or more network devices and associated functions and adjusting one or more of the operational parameters of the other network devices.

In accordance with another embodiment, a network device is provided. The network device comprises a port adapted to receive a transmission medium for transmitting a power signal, a control module to control a state of the power signal as supplied to a selected other network device by said network device in response to a control signal representative of a state of a network having a selected topology associated with said network device.

In accordance with another embodiment, in a network having one or more network devices powered at least in part by a Power Over Ethernet (POE) connection, a method is provided for controlling access to the network. The method comprises the steps of detecting a security event in the network; and disabling power to a network device using POE in response to the security event. A security event is any event which may indicate an attack or intrusion to the network. An Intrusion Detection System (IDS) is a well known method to detect some security events. Other methods of detecting security events include, but are not limited to: firewall events, authentication failures, events from servers and gateways, illegal addresses, router events, or even new MAC address detection by an access device. Any event deemed interesting by a network administrator might be classified as a security event.

In accordance with another embodiment, in a network having a plurality network devices powered at least in part by Power Over Ethernet (POE) connections, a method is provided for managing power to the plurality network devices. The method comprises the steps of: determining an amount of network resources to support a service level; and supplying power to selected ones of the plurality of network devices to provide the amount of network services.

In accordance with another embodiment, a device capable of providing power to one or more network communication devices in a network environment is provided. The device comprises a mechanism for controlling power to at least a portion of the one or more network communication devices, a mechanism for determining at least one of an area of the network environment having redundant network access coverage and an area of the network environment having other redundant capability, and a mechanism for adjusting parameters of the one or more network communication devices to change at least one of the size of the area of the network environment having redundant network access coverage and the area of the network environment having other redundant capability, wherein the mechanism for controlling power to at least a portion of the one or more network communication devices takes an action to power off at least one of the communications devices based at least one of the area of the network environment having redundant network access coverage and the area of the network environment having other redundant capability.

In accordance with another embodiment, a method is provided for controlling power to one or more network communication devices in a network environment. The method comprises the steps of determining at least one of an area of the network environment having redundant network access coverage and an area of the network environment having other redundant capability, adjusting parameters of the one or more network communication devices to change at least one of the size of the area of the network environment having redundant network access coverage and the area of the network environment having other redundant capability, and taking an action to power off at least one of the communications devices based on at least one of the size of the area of the network environment having redundant network access coverage and the area of the network environment having other redundant capability.

In accordance with another embodiment, a device capable of providing power to one or more network communication devices in a network environment is provided. The device comprises a mechanism for controlling delivery of power to the one or more communication devices, the mechanism being configured to power on or power off a selected one of the communication devices based on one of an event and a requirement for the selected communication device, a mechanism for determining if a service provided by the selected device is required in the network, and a mechanism for adjusting network communication device parameters to change one of a state of network access and an area of network coverage.

In accordance with another embodiment, a method of controlling a network is provided. The method comprises the steps of determining network service requirements for the network; providing the network service requirements with a first set of network devices; and powering down a second set of network devices, wherein the second set of network devices includes network devices not required to provide a predetermined service level for the network service requirements.

In accordance with another embodiment, a method is provided for managing power of a network device. The method comprising the steps of determining one or more operational characteristics of a network associated with the network device, managing power consumption of the network device based on the one or more operational characteristics of the network; and adjusting operation parameters of other network devices in the network.

The details of various embodiments of the invention are set forth in the accompanying drawings and the description below.

BRIEF DESCRIPTION OF THE DRAWINGS

The foregoing and other objects, aspects, features, and advantages of the invention will become more apparent and may be better understood by referring to the following description taken in conjunction with the accompanying drawings, in which:

FIG. 1 is a flow diagram depicting an illustrative method for practicing an embodiment of the present invention;

FIG. 2 is a flow diagram depicting an illustrative method for practicing another embodiment of the present invention.

FIG. 3 is a flow diagram depicting an illustrative method for practicing an embodiment of the present invention in a wireless network.

DETAILED DESCRIPTION

Figure 4:
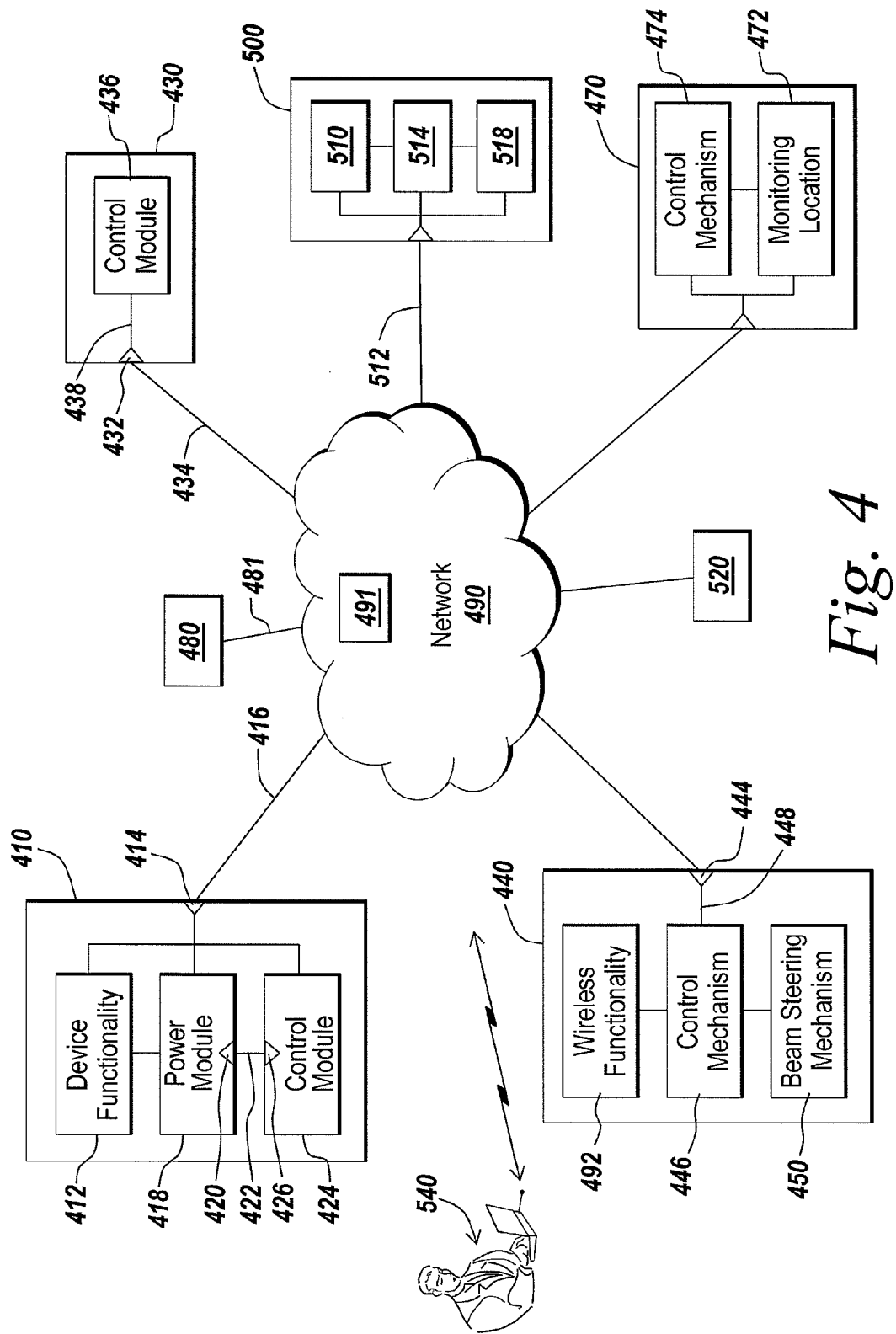
FIG. 4 is a block diagram depicting an illustrative network depicting various embodiments of network devices of the present invention.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not expressly made herein, without departing from the spirit and scope of the invention.

FIG. 1 depicts a flow chart 100 of one embodiment for a method for managing power of a network device. In this example, the first step involves determining one or more operational characteristics of a network associated with the network device 110. Power of the network device is then managed based on the one or more operational characteristics of the network.

The network device can be any number of devices that are connected to and communicate over a network. Examples of network devices include, but not limited to, routers, bridges, servers, switches, wireless access points, wireless repeaters, Voice over IP (VoIP) devices, and the like. Certain embodiments of network devices are discussed in more detail below.

The network can be a Local Area Network (LAN), a Wide Area Network (WAN), a virtual private network (VPN), a wireless network, or any combination thereof. The network may include a number of network devices for which the power may be managed. Other possible networks will be apparent to one skilled in the art given the benefit of this disclosure.

With regard to the first step 110 of the method of FIG. 1, operational characteristics can be any number of characteristics or parameters that relate to the operation of network. Examples of operational characteristics include, but are not limited to, usage of the network, the state of a primary network link, security of the network, loss of connectivity, bandwidth usage of a link or the network, redundancy in the network, or the like. There are a wide variety of operational characteristics which may be useful to help determine the ability to change power setting and/or increase the security of a network. Redundancy is a prime characteristic which is used in any algorithm to help make optimal decisions. In a wireless network any overlap in the RF coverage area for a set of devices may be part of a network redundancy. Backup or parallel links in the infrastructure or to attach servers systems are other forms of redundancy. Certain other examples will be discussed in greater detail below. Other embodiments will be apparent to one skilled in the art given the benefit of this disclosure.

After one or more operational characteristics have been determined, the power consumption of the device can be managed as seen in step 120 of FIG. 1. Managing the power consumption of the network device may involve powering off the device, powering on the device, placing the device in a cold, warm, or hot standby state, reducing power to the device, increasing power to the device, or any combination thereof. Control signaling may also be used to change the operational parameters of the device such that the amount of power consumed by the device is altered. By managing power consumption of the network device directly through the sourced power or indirectly through changes to the operational parameters, the operational characteristics or parameters of the network device as well as the network itself may be adjusted. Complex algorithms are often needed to insure little or no loss of network services occur as redundancies in the network are managed and often reduced to facilitate increases in security and savings in power. The algorithms attempt to power down unneeded resources often removing redundancies and also re-enable these resources before or as they are needed to continuously provide full network services.

In one example of operation, the state of the primary link of the network device may be determined and, based on the state of the primary link, the power consumption of a redundant link may be managed to place the redundant link into a standby state. In another example of operation, a security event in the network is determined and in response to the security event power is disabled a network device. Thus, the suspect network device is disabled.

In one embodiment, power consumption management may be performed using the IEEE 802.3af standard for Power over Ethernet (PoE). Power over Ethernet (PoE) allows for power to be delivered over the Ethernet cable to power network devices. Power is generally provided by a power inserting device (midspan insertion) or by integrating the power and control logic into a switching or relay device generally used for packet relay services in Ethernet based networking systems. Typically these PoE systems are managed.

In another embodiment as shown in FIG. 2, a flow chart 200 is provided for an exemplary method for controlling power to one or more network communication devices in a network environment. The first step involves determining one or more operating characteristics such as an area of the network environment having redundant network access coverage, other redundant capability, or both (step 210). Parameters of the one or more network communication devices may then adjusted based on the one or more determined operating characteristics (Step 220). For example, the size of the area of the network environment having redundant network access coverage, other redundant capability, or both may be changed. Finally, an action may be taken to manage power for at least one of the communications devices based on the size of the area of the network environment having redundant network access coverage, other redundant capability, or both (step 230). For example, the one or more network device may be powered down. The area of the network environment having redundant network access coverage may be provided by wireless access points, redundant links in a topology of the network environment, additional switching capacity, or one or more additional communication links in a mesh topology. In certain embodiments the method of FIG. 2 is performed in a network device. Suitable network devices have been discussed herein above.

In the embodiment depicted in FIG. 3, the methodology of FIG. 1 is applied to a wireless network. FIG. 3 shows a flow chart 300 of a method for managing power of a network device providing wireless connectivity to a network. In this embodiment, the first step 310 involves determining one or more operational characteristic such as a state of wireless connectivity provided by the network. For example, one or more network traffic characteristics, RF power settings and/or antenna characteristics for each wireless connection to the network provided by the network device. The parameters of the wireless network or network device may then be adjusted based on the state of the wireless network in step 320. This may include moving wireless users or services, changing QOS requirements, stopping or starting the advertisement of services, altering the frequencies or channels of operation or otherwise altering services. In step 330 the power of the network device is managed based on the state of wireless connectivity. This may include powering down a network device to conserve power or placing the device in a reduced power mode. In embodiments where the wireless network includes several wireless devices, this process may be performed for each network device and/or the system as a whole for the coverage area. Alternately activity of step 320 may be performed after the activity of step 330. Other steps may added be to move wireless users or services, change QOS requirements, stop or start advertising services, alter frequencies or channels of operation or otherwise alter services of a single device, sets of devices or the entire system.

In another example, the power management of network devices may be based on the presence and required services of a network user. For example the presence of a user may be determined by detecting the user accessing the wireless network with a certain application. In another embodiment, the user may also be detected using other means like Radio Frequency Identification (RFID) badge, use of a security pass, motion sensors, or the like. The operating parameters of one or more network devices can then be adjusted based on the presence of the user and in turn, the power consumption. For security purposes, it may be desirable to power down certain network devices such as wireless access points or VoIP phones when they are not needed or the primary user is in another location. Thus when a user leaves the vicinity of such a network device, the network device may be powered down or set to a low power mode or services altered to reflex limited use (911 only). In turn, when a user enters the vicinity of the network device, the device can then be powered up to provide network access to the user. Using such a technique it is also possible to have network functionality track with a user through a facility or coverage area. That is, when a user moves from a first area to a second area, the network devices in the first area may be powered down and the network devices in the second area powered on. Power consumption and security concerns are thus minimized because only necessary network devices are powered. Likewise, in certain embodiments, additional network devices may be powered up to increase coverage, QOS requirements, or bandwidth as necessary. Such techniques may also be applied for multiple users on the network and all parameters of a policy management system. That is, power management may be used to power up or down network devices as needed to provide coverage as the number of users or service needs on the network changes.

In certain embodiments, the power management, such as powering down, of one network device may also require to adjustment of operational characteristics or parameters of other network devices. For example, if one network device such as a wireless access point, is powered down, other wireless devices may have their coverage area increased, by changes to their RF transmit power and receiver sensitivity, to compensate. In another example, if a network switch is powered down because of a security event, additional switches or redundant links may be activated to maintain bandwidth and connectivity. The adjustment of operational parameters of other network devices may be accomplished by control signaling or using the power management techniques disclosed herein.

An example of an embodiment of a network employing power management of the present invention can be seen in FIG. 4. Here the network features a number of network devices 410, 430, 440, 470, 480, 500 interconnected over a network 490. It should be understood that the network configuration of FIG. 4 is for exemplary purposes to demonstrate different embodiments of network devices. A network may include any number of network devices in any number of combinations. Additional network configuration will be apparent to one skilled in the art given the benefit of this disclosure.

In this example, network device 410 of FIG. 4 includes the functionality for power management. Along with the device functionality 412 that provides for services such as switching, routing, wireless access or VoIP telephony; network device 410 features a port 414 adapted to receive a transmission medium 416 for transmitting a power signal, a power module 418; and a control module 424.

In this example, network device 410 is powered over attached cable 416. The power module 418 has circuitry to manage power consumption of said network device 410 and an input 420 to receive a control signal 422. The circuitry of the power module 418 is configured to, upon receipt of a control signal 422 from the control module 424 take an action to change the level of power consumption of the network device 410 to provide a selected level of service based on the change in the state of the network 490.

The control module 424 is configured to monitor the state of the network 490. When a change in the state of the network id detected, a control signal 422 is sent from output 426 to the power module 418. The state of the network may be based on any number of the operational characteristics discussed throughout this disclosure. For example the state of the network may indicate a state of a primary communications link of the network device or the location of a user. Other possible states of the network will be apparent to one skilled in the art given the benefit of this disclosure.

Actions taken by the circuitry of the power module 418 can include, but are not limited to, powering down the network device, placing the network device in a state of standby such as hot, warm or cold standby, and powering up all or a portion of the network device. For example, the action taken may involve managing power consumption of a portion of the network device associated with a redundant communications link of the network device based on the state of the primary communications link of the network device such as placing the redundant communication link in a standby state. Alternately, the receiver portion of a VoIP telephony device may be powered up based on the reception of a call and powered down at the end of a call.

Network device 430 is an example of a Management and Control Entity (MCE) in switch based and managed implementations of POE where power is sourced and controlled by the switch 491 or other network controlled device (such as a midspan power providing device). Attached device 480 attached by Ethernet cable 481 may be powered down by the network when desired. Network device 430 includes a port 432 adapted to receive a transmission medium 434, such as an Ethernet cable, for transmitting a power signal and a control module 436 to control a state of the power signal. The signals are supplied to a selected other network device (491, 440) by network device 430 in response to a control signal 438 representative of the state of a network having a selected topology associated with network device 430 or 480. By controlling the state of the power signal supplied to the selected other network devices (491, 440) network device 430 is able to increase or reduce the amount of one or more services provided by the network 490.

Network device 500 is another example of a Management and Control Entity (MCE). Here network device includes mechanisms 510, 514, and 518. Mechanism 510 for controlling delivery of power over a transmission medium 512 to the one or more selected network devices (440) is configured to power on or power off a selected one of the network devices (440) based on an event or requirement for the selected network device. An example of an event is a network service request such as from a building access control system or surveillance mechanism 520. Examples of surveillance mechanism include, but are not limited to, an image acquisition device, a motion detector, a noise detector, an image acquisition device, and a card reader. Mechanism 514 determines if a service provided by the selected device is required in the network. Mechanism 518 is configures to adjust network device parameters to change the state of network access or an area of network coverage.

Network device 440 is an example of wireless access point utilizing network power management allowing a user 540 to wirelessly connect to the network. In addition to the wireless functionality 442 of a wireless access point, network device 440 includes a port 444 for connecting to the network and control mechanism 446 for receiving a control signal 448 from a device such as network devices 430, 470, and 500. In certain embodiments, network device may further include a beam steering mechanism 450.

The control mechanism is configured to, in response to the receipt of a control signal from a device such a network devices 430, 470, and 500, takes an action to power down, power powering up, reduce an amount of power consumption, increase an amount of power consumption, maintain an amount of power consumption, or the like. In embodiments having a beam steering mechanism 450, the beam steering mechanism 450 is configured to, in response to the receipt of a control signal from a device such a network devices 430, 470, and 500, take an action to provide a selected level of wireless access coverage while conserving an amount of power consumed of the plurality of wireless access points. In certain embodiments, only portions of the network device 440 are power managed using the techniques herein.

Network device 470 in another Management and Control Entity (MCE) configured to work with one or more wireless access points (440). In this example, network device 470 includes a monitoring mechanism 472 and a control mechanism 474. The monitoring mechanism 472 is configured to monitor one or more wireless connectivity parameters of the network. In certain embodiments this involves sampling at a selected rate to detect a change in a number of wireless network users. In other embodiments, the monitoring mechanism 472 may comprise or include a location mechanism configured to determine a location of one or more network users.

The control mechanism is configured to output a control signal based on the one or more monitored wireless connectivity parameters of the network. In some embodiments the control signal is outputted based on a change in the number of users. In another embodiment having a location mechanism, the control signal is generated based on the location of one or more users.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A method for managing operational power of a wireless network access point device, the method comprising:
   determining a number of users associated with a wireless network access point device associated with a coverage area, the number of users being associated with an area of a network having an overlap in RF network access coverage;
   detecting a change in the number of users associated with the wireless network access point device; and
   in response to the detecting, managing the coverage area of the wireless network access point device by powering up or down all or a portion of the wireless network access point device based on the changed number of users.

2. The method of claim 1 wherein the determining the number of users comprises:
   determining a presence of one or more users of the network.

3. The method of claim 1 wherein the managing of the coverage area of the wireless network access point device comprises:
   controlling a state of the wireless network access point device.

4. The method of claim 3, wherein the controlling of the state of the wireless network access point device comprises:
   instructing the wireless network access point device to operate in a reduced power mode.

5. The method of claim 1, wherein the managing of the coverage area of the wireless network access point device comprises:
   adjusting one or more parameters of the wireless network access point device.

6. The method of claim 1, wherein power to the wireless network access point device is provided by Power Over Ethernet (POE).

7. The method of claim 1, further comprising determining a level of redundancy in the network.

8. The method of claim 1, further comprising determining an event in the network.

9. The method of claim 8, wherein the event in the network relates to at least one of network security, network connectivity, network coverage, a presence of a device, and a presence of a user of the network.

10. The method of claim 1, wherein the network is a wireless network.

11. The method of claim 10, further comprising determining a state of wireless connectivity provided by the network.

12. The method of claim 1, wherein the network comprises multiple wireless network devices, wherein the managing of the coverage area of the wireless network access point device comprises:
  managing power requirements of one or more of the multiple wireless network devices based on one or more operational characteristics of the network.

13. A wireless network access point device comprising:
  a port adapted to receive a transmission medium for transmitting a power signal;
  a power consumption module having circuitry configured to manage operational power consumption of the wireless network access point device; and
  a control module for:
    determining a number of users associated with a wireless network access point device associated with a coverage area, the number of users being associated with an area of a network having an overlap in RF network access coverage,
    detecting a change in the number of users associated with the wireless network access point device, and
    in response to the detecting, managing coverage area of the wireless network access point device based on the changed number of users, wherein the managing of the coverage area of the wireless network access point device causes the circuitry in the power consumption module to power up or down all or a portion of the wireless network access point device.

14. The device of claim 13, further comprising:
  functionality to provide one or more network services.

15. The device of claim 13, wherein the control module determines the number of users upon detecting a presence of one or more users of the network.

16. The device of claim 13, wherein the control module changes a state of the wireless network access point device.

17. The device of claim 16, wherein the state of the wireless network access point device is a power mode, and wherein the control module is configured to manage the coverage area of the wireless network access point device by instructing the circuitry in the power consumption module to operate the wireless network access point device in a reduced power mode.

18. The device of claim 13, wherein the control module manages the coverage area of the wireless network access point device upon detecting a level of overlap in the coverage area.

19. The device of claim 13, wherein the control module is configured to manage the coverage area of the wireless network access point device by adjusting one or more parameters of the wireless network access point device based on one or more operational characteristics of the network.

* * * * *